United States Patent [19]

Dougherty

[11] Patent Number: 5,060,892
[45] Date of Patent: Oct. 29, 1991

[54] PLUMBING HANGER BRACKET ASSEMBLY

[76] Inventor: Glen Dougherty, 1426 W. Madison St., Ottawa, Ill. 61350

[21] Appl. No.: 587,077

[22] Filed: Sep. 24, 1990

[51] Int. Cl.$^5$ .............................................. F16L 3/22
[52] U.S. Cl. ...................................... 248/57; 248/68.1
[58] Field of Search ............. 248/57, 68.1, 225.1, 248/70, 200.1

[56] References Cited

U.S. PATENT DOCUMENTS

| | | | |
|---|---|---|---|
| 1,213,865 | 1/1917 | Gunn | 248/57 X |
| 1,791,420 | 2/1931 | Mayo | 248/57 X |
| 2,788,188 | 4/1957 | Smith et al. | 248/57 |
| 2,824,312 | 2/1958 | Tortorice | 248/57 X |
| 4,717,101 | 1/1988 | Harrod | 248/57 X |
| 4,909,461 | 3/1990 | Collins | 248/57 X |

FOREIGN PATENT DOCUMENTS 472778 9/1937 United Kingdom .............. 248/68.1

Primary Examiner—Alvin C. Chin-Shue
Attorney, Agent, or Firm—Edward D. Gilhooly, Ltd.

[57] ABSTRACT

A hanger bracket assembly for water pipes having a pair of telescopic bracket sections formed with end flanges for attachment to vertical spaced studs of a building under construction. The bracket sections have openings through which a water supply pipe may extend. A pair of plastic sleeve members have openings alignable with selected openings of the bracket sections for further support of the pipe section.

3 Claims, 1 Drawing Sheet

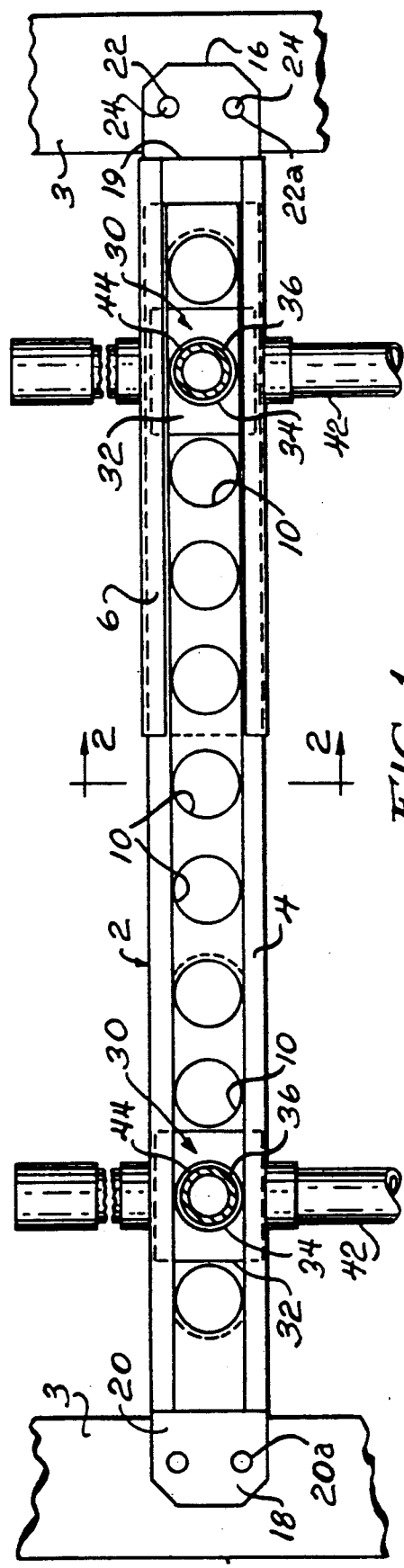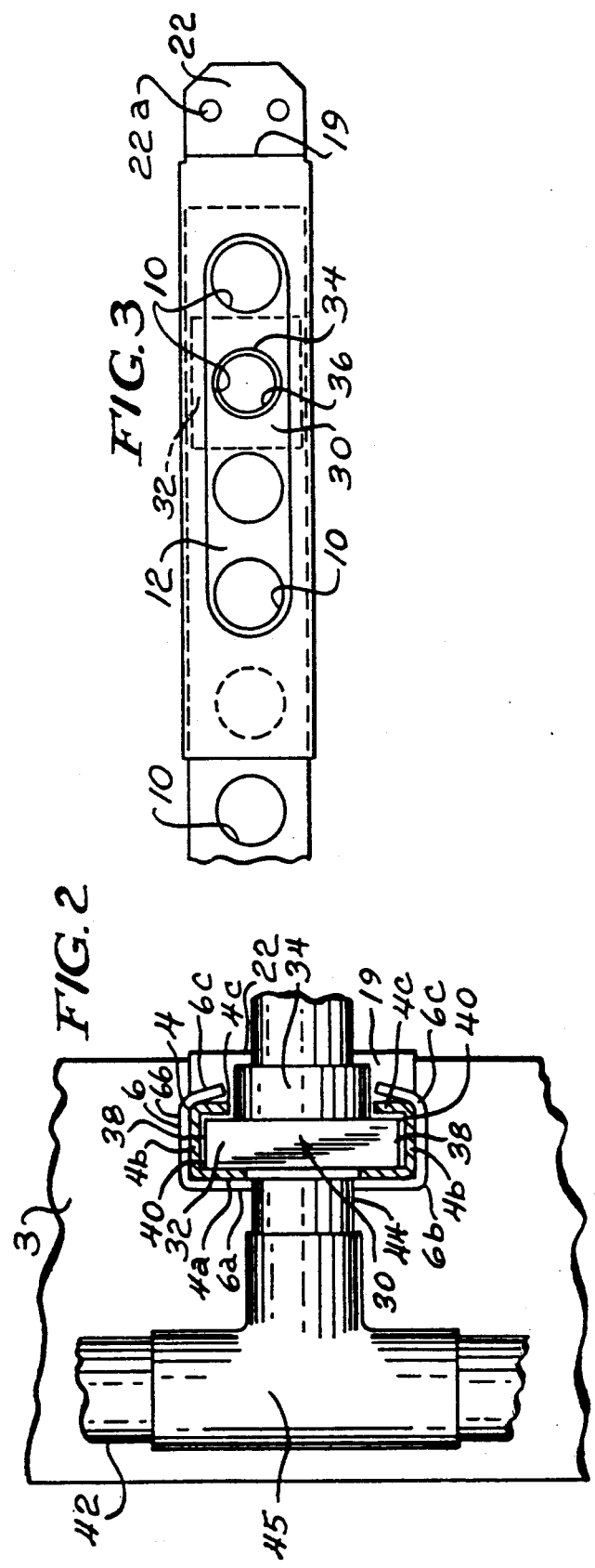

PLUMBING HANGER BRACKET ASSEMBLY

BACKGROUND OF THE INVENTION

1. Field of the Invention

This invention relates to plumbing and more particularly, to a hanger bracket assembly for installing plumbing fixtures.

2. Description of the Prior Art

During construction of houses and the like, water supply pipes for lavatories, sinks, water closets, and other plumbing fixtures are roughed in prior to completion. This procedure in installation permits the later attachment of the plumbing fixtures and completion of the wall components. It is a common problem in prior techniques that pipes are initially installed without adequate support by which damage to the water supply pipes or provide difficult subsequent installation of the plumbing fixtures. Therefore, it is desirable that an improved support device be provided to facilitate the installation of a plumbing system in a house or the like.

SUMMARY OF THE INVENTION

It is an objective of the invention to provide a hanger bracket assembly for supporting water supply pipes prior to attachment of plumbing fixtures during construction of a structure. The hanger bracket assembly of the invention includes a telescopic hanger bracket arranged to span adjacent studs and the like for attachment. The hanger bracket of the invention possesses a plurality of holes along its length in which a pipe section from a tee joint on the hot or cold water supply may be inserted for subsequent attachment to a plumbing fixture. A pair of plastic sleeves are slidably mounted on the hanger bracket for alignment with a selected one of the hanger bracket holes. The plastic sleeves hold the pipes for attachment with the plumbing fixture and prevent electrolysis from one metal to another.

BRIEF DESCRIPTION OF THE DRAWINGS

FIG. 1 is a front elevational view of plumbing hanger bracket assembly of the invention;

FIG. 2 is an end elevational view, with parts in section; taken along line 2—2 of FIG. 1; and FIG. 3 is a partial rear elevational view of the hanger bracket of FIG. 1.

DESCRIPTION OF THE PREFERRED EMBODIMENT

Referring to FIGS. 1-3 there is illustrated the hanger bracket assembly of the invention, generally designated by reference numeral 2. The hanger bracket assembly 2 includes a pair of elongated metallic bracket sections 4 and 6. The bracket sections 4 and 6 are disposed in telescopic relationship to permit the length of the hanger bracket assembly 2 to be adjusted to match the spacing of conventional studs 3 in the building being erected. As seen in FIG. 2 and 3, the bracket section 4 includes a modified U-shaped cross section comprising base 4a, opposite perpendicular sides 4b, and inwardly disposed flanges 4c. The bracket section 6 also possesses a modified U-shaped cross sectional configuration, complimentary to the cross section of section 4, comprising base 6a, opposed sides 6b, and inwardly disposed flanges 6c. The cross section of bracket section 6 is arranged to embrace the bracket section 4 for relative telescopic movement of the two sections for span adjustment.

A plurality of spaced holes 10 of approximate equal size are arranged substantially along the length of bracket section 4. The holes 10 are formed with a diameter sufficient to permit insertion of a pipe section as will be apparent. As seen in FIG. 3, bracket section 6 includes an elongated slot 12 of a width to expose a plurality of holes 10 in at least some adjusted overlapping portions of bracket sections 4 and 6. The use of slot 12 reduces alignment problems between the holes of the respective sections 4 and 6, although a plurality of holes (not shown) can also be formed in bracket section 6.

The opposite ends 16 and 18 of bracket sections 4 and 6 are bent in a lateral direction along lateral sections 19 to provide offset flanges 20 and 22 (FIG. 2). The flanges 20 and 22 have holes 20a and 22a to permit screws or nails 24 to attach the hanger bracket assembly 2 to studs 3. The offset orientation of flanges 20 and 22 aligns the hanger bracket assembly 2 at a position disposed in set back relation between studs 3.

A pair of plastic sleeves 30, such is fabricated from a PVC material and the like, are provided having a rectangular shaped base 32 and are slideably mounted within bracket section 4. A tubular extension 34 integrally is formed on base 32. A pipe receiving hole 36 extends through tubular extension 34 and base 32. The opposed sides 38 of base 32 are arranged to be positioned within the track 40 defined by the base 4a, sides 4b, and flanges 4c of bracket section 4. The track 40 retains the sleeves 30 in place while permitting relative lateral movement within bracket section 4 for alignment of the sleeves 30 with a respective pipe section.

In use of the hanger bracket assembly 2 of the invention, the plastic sleeves 30 are inserted into the channel 40 of bracket section 4. The other bracket section 6 is then connected to bracket section 4 in telescopic relation. The extent of the interfitted bracket sections 4 and 6 are then adjusted in accordance with the width between studs 3 for attachment. The nails or screws 24 are used to affix the flanges at the opposed ends of hanger bracket assembly 2 to the studs 3. The plastic sleeves 30 are moved in the channel 40 until they are aligned with the actual position at which the water supply pipes 42, normally separate hot and cold water pipes, and the perpendicular supply section 44 are "roughed in". The pipe sections 44 are respectively inserted through both plastic sleeves 30 from the back for support by the bracket. It should be apparent from the foregoing that the holes 36 of the plastic sleeves 30 are aligned with selected holes of bracket section 4. The pipe sections 44 are commonly coupled to supply pipes 42 by a T-element 45 (as seen in FIG. 2). The sections of pipe 44 will extend outside of the wall (not shown) and into the room, often being referred to a supply pipes or lookouts. The plastic sleeves provide protection against electrolysis from one metal type to another.

What is claimed is:

1. A plumbing hanger bracket assembly comprising elongated first and second bracket members having opposed end portions attach to spaced supports, said first and second bracket members being retained in telescopic relation to each other for varying the spacing between said end portions, said first bracket member including a plurality of circular openings disposed along the length thereof, a plurality of sleeve members being mounted for relative movement on said first bracket member, each of said sleeve members having an opening for alignment with one of said plurality of openings of said first bracket member, said opening of each of said sleeve members and said one of said plurality of openings of said first bracket member being arranged to receive respective fluid pipe sections for support, said first and second bracket members having complimentary modified U-shaped edge portions, said complimentary edge portions of said second bracket member overlapping said edge portions of said first bracket member along a variable portion of the length of said first bracket member, said second bracket member having an elongated slot for permitting the respective pipe sections to extend therethrough, and said plurality of sleeve members having opposed edge portions being slideably retained in said U-shaped edge portions of said first bracket member.

2. The hanger bracket assembly according to claim 1 wherein said plurality of sleeve members are plastic.

3. The hanger bracket assembly according to claim 1 wherein said plurality of sleeve members have a base including a pair of parallel edge portions forming said opposed edge portions.

* * * * *